United States Patent [19]

Sümeghy

[11] 4,374,692
[45] Feb. 22, 1983

[54] PROCESS FOR PRODUCING A SURFACE VENEER ON FURNITURE AND THE LIKE

[75] Inventor: Gábor Sümeghy, Budapest, Hungary

[73] Assignee: IV. Ker. Epitoipari Szovetkezet, Budapest, Hungary

[21] Appl. No.: 240,454

[22] Filed: Mar. 4, 1981

[51] Int. Cl.³ .................... B29C 19/00; B32B 21/08
[52] U.S. Cl. ........................ 156/244.11; 144/344; 156/244.26; 156/244.27; 428/511; 428/514
[58] Field of Search ............ 428/511, 514, 541; 156/244.11, 244.26, 244.27; 144/309 B, 313, 315 A, 317, 271, 254, 344

[56] References Cited

U.S. PATENT DOCUMENTS 1,261,445  4/1918  Schreibman .................. 144/271
4,152,313  5/1979  Fogle et al. .................... 428/514

Primary Examiner—Paul J. Thibodeau

[57] ABSTRACT

Process for producing a surface wood veneer on furniture or the like which comprises extruding a strip of synthetic thin-walled carrier body, forming a wood veneer band which is softened by wetting or ammonia treatment, applying an adhesive between the veneer band and body and guiding the veneer band onto the body. The veneer band is then subjected to an oscillating pulsator provided with a heat and pressure transmitting stamp in a conditioned space during continuous progress of the veneer band and carrier body and without deformation of the thin-walled carrier body.

5 Claims, 5 Drawing Figures

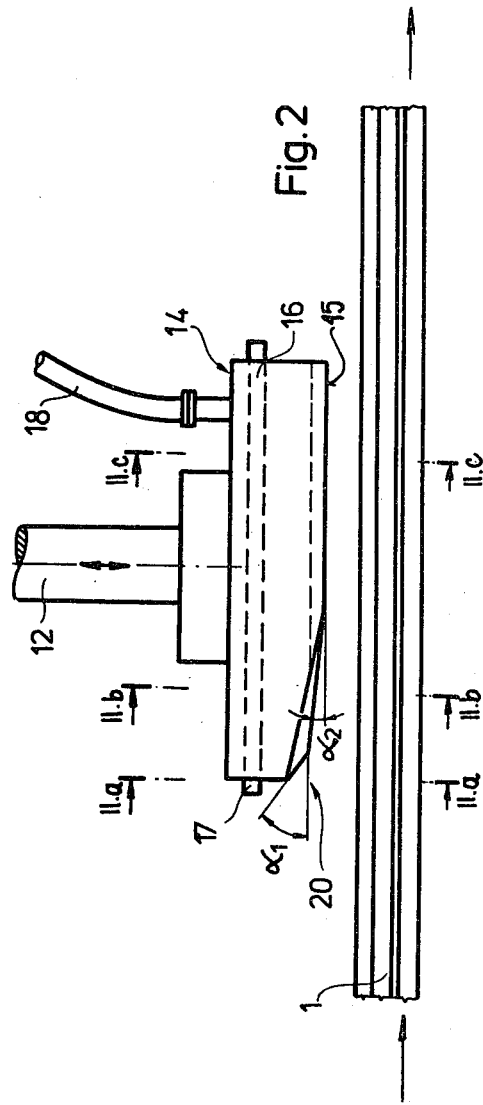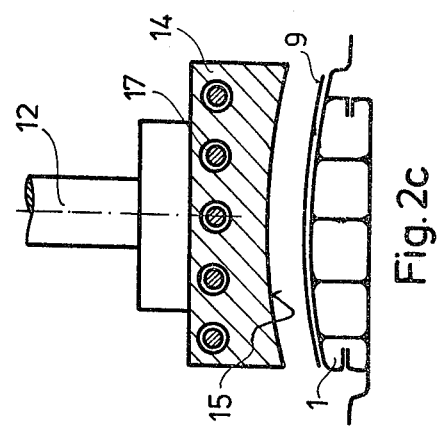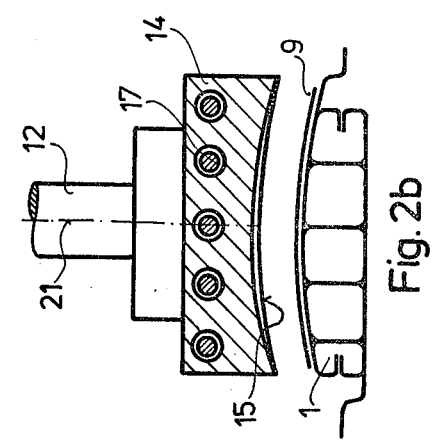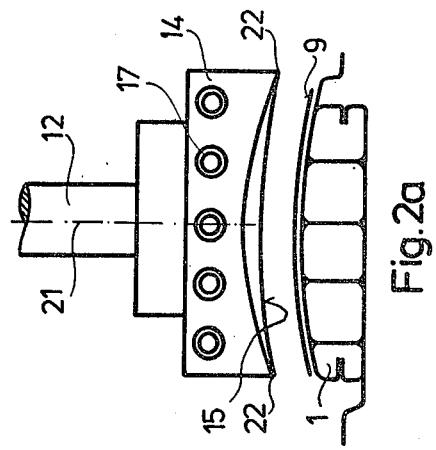

PROCESS FOR PRODUCING A SURFACE VENEER ON FURNITURE AND THE LIKE

BACKGROUND OF THE INVENTION

The invention relates preferably to a surface covering product suitable for use in the furniture and construction industry, furthermore to a process and apparatus for its production.

Surface covers are made by a conventional method with the use and jointed assembly of strips or laths having a straight and/or curved-jointed surface, and produced with a continuous extrusion from the mixture of colouring agents added to the melt of thermoplastic synthetic materials according to processes known in the synthetic industry. Such variation of the process is also known, when batches of the melt to be extruded are colored differently, then the batches are interfused proportionately and this way the strips or laths obtain a characteristically grained pattern imitating or resembling the grain of wood. A drawback of the processes is that the appearance of the surface of the finished product is monotonous, thus they meet only modest aesthetic demand. On the other hand an advantage of the process is that the laths extruded from synthetic material preferably from hard PVC, are accurate to dimension, solid despite their length, and not inclined to dimension variation and warping.

There are processes in the wood working industry, when long laths are sawn from timber (planks and boards), planed, followed with cutting various articulations into the surface of the laths, and the so-formed surfaces are coated with lacquers. This process is also disadvantageous, because strips or laths of limited length, not longer than 3 m can be produced from the valuable—and aesthetically pleasing—wood types with short log, and in addition the material lost be planing and cutting during the process is considerable generally exceeding 40%. Thus the laths (e.g. wall covering laths) made of valuable hard woods (e.g. oak, walnut, cherry, etc.) are very expensive. In addition the proportion of laths warped and unsatisfactory in respect of the surface quality is high, and moreover the warping and grain parting on the surface occurring after fitting on as a result of the subsequent dampness render the final quality uncertain. A further drawback is that no mass production of laths longer than 2.5 m is possible without junction.

There are processes in the wood working industry, when the natural wood of poor quality or the artificial wood varieties are covered with veneers of high technical and aesthetic value by use of sticking—laminating processes. A drawback of this process is that the balanced behavior of wood layers with varying stress-content, i.e. the formation of long laths free from warping is difficult and the uneven wettness effects ensuing in the course of application—despite the costly process—will cause generally known deformation. Such solution is described for instance by Roland Siebert in his book: "Möbelbau" (Verbesserte 2. Auflage, Leipzig, GDR).

The cost of the process is increased by the fact, that compliance with the principle of symmetry is necessary at the laminations, in order to avoid warping. Thus the sticking of plywood onto the backside is also necessary, despite that from an aesthetic and functional point of view this layer represents unnecessary use of material, additional work and cost.

The wood or artificial wood layers destined for ensuring the strength and trueness to shape are always prone to deformation, which as a drawback is characteristic to the above processes and products.

As a result of the listed adverse characteristic none of the synthetic materials and wood veneers is suitable to meet the different demands of the furniture and construction industry, to such extent, that they could have been used separately and generally in the two different kinds of industrial fields.

The invention is aimed at elimination of the above shortcomings, i.e.—by special jointing process of the two different types of material—to produce a product of such property and quality, which is equally applicable in both industrial fields and meets their several demands, which is useable as a structural material, surface covering product, ornamental cover and for other decoration purposes in the furniture and construction industry. Furthermore it is resistant to stress as well as a wood substitute to a great extent.

SUMMARY OF THE INVENTION

The process according to the invention specifies the role of wood and synthetic material and their combination in a novel way and to advantage by combining the properties of two materials having only limited application possibility by themselves, with a so far not used simple solution in such a way, that a new product is realized with the solution with a new field of application and with manifold utilization possibility.

The basic material, or carrier layer of material for the products of new material composition according to the invention is synthetic material not sensitive to the effect of dampness, which meets the strength demand (dimension, and trueness to shape), while the joined economically small amount of natural wood (0.5–0.8 mm thick) appears exclusively on the surface and in addition of forming a homogeneous combination with the synthetic material ensures the favourable aesthetic effect and use for decorative purposes. The process combines these two materials—according to a fixed proportion—during a continuous production process and results in a new material in respect of its properties, which is characterized by high accuracy (cross sectional tolerance ±0.2–0.3 mm), trueness to shape, and practically endless lenght. In addition, from aesthetic point of view the application possibility and pleasing appearance of the highly valuable aesthetic wood types in long pieces of laths are ensured. The processes known so far have not made possible the production of laths being true to shape (long laths, e.g. wall covering laths) from the valuable hard wood types, at which the slenderness ratio (cross section related to length) would have exceeded the $\lambda = 1.60$ ratio. For the products of combined material composition realized with the process according to the invention a slenderness ratio exceeding $\lambda = 1/100$ value is obtained while the trueness to shape is fully ensured.

At the jointing process realizing the combination of the carrier synthetic material and the layer of natural wood-veneer, especially during the production process of covering curved-jointed synthetic surfaces with natural wood-veneer by sticking and pressing, a double task is to be solved: partly the water admitted earlier for malleability (softening) of the wood veneer is removed and partly it is necessary to ensure removal of the vapor of water or other solvent present in the adhesive. The fast and identically timed synchronization and timed completion of the two evaporation processes are necessary in respect of the proper sticking process of the jointing.

In case of covering flat extruded laths with wood veneer, the preliminary softening (wetting) of the veneer can be dispensed with. In this case exclusively the fast removal of the adhesive vapor, or in case of using fusion adhesive the fast cooling of the adhesive have to be ensured in order to avoid the strength deterioration arising to the heat effect of the in many cases thin-walled carrier layer. On the other hand a thin-walled material-saving carrier layer can be used only if the heat of the 180°–240° C. adhesive can be dissipated at a fast rate during the process.

When veneers are used for covering, in case of the intermittent sticking-contact pressing processes used in the wood working industry—when the material is in the press until the adhesive sets and the carrier of the thin veneer is a large mass of wood or artificial wood-,—removal of the moisture in the veneer and vapors of the water or solvent—and possibly large volume of heat—present in the adhesive does not represent the technical problem, because the thick and hygroscopic wood layer is capable to absorb the vapors (heat). Simultaneous removal of the vapor of the two materials admitted for different purpose and extent, i.e. completion of the two processes at the same time—in case of these known processes—can be solved by contact pressingtime set to the termination of the process requiring the longer diffusion time.

In case of covering the surface with wood veneer, realization of the jointing of the synthetic material, mainly that of the extruded synthetic having jointed surface, diffusion of the water vapor used for softening or plasticizing (preferably ammonia treatment) the veneer and diffusion of the solvent vapor of the adhesive—because of the sealing layer produced by the synthetic material—can take place exclusively towards the veneer layer. However, in this case the contact heat pressing processes known in the wood working industry—sealing on both sides permanently—are not applicable. On the other hand at realization of the invention, the parallel simultaneous removal of the two different types of vapor having different quantitative proportions, is necessary for the proper sticking aimed at jointing the surfaces, since the repeated solidifications of the veneer from the softened (placticized) state (time of complete dewatering) shall coincide with solidification of the adhesive (time of evaporation of the adhesive-solvent vapor).

Substance of the process according to the invention is that in a final phase of the work process it enables the diffusion of the water vapor and solvent vapor towards the veneer surface, and in addition the fast and simultaneous removal of the vapor of the two materials admitted for different purposes and in different quantities is possible in this final phase.

In this final phase of the work process—by use of increased ventilation—the fast cooling of the surface of flat products jointed with fusion adhesive, as well as cooling of the adhesive are possible.

Fast removal of the solvent and fast cooling of the adhesive are necessary first of all because the solvent and high temperature (about 180°–240° C.) reduce the strength of the thermoplastic synthetic carrier layer, and this effect can be counterbalanced only by increasing the wall thickness (mass) of the carrier layer, and by fast removal of the heat and solvent.

The process according to the invention, even when using solvent type adhesives, enables the fast evaporation of the solvent with pulsating heat transfer and in case of using fusion adhesives it ensures the fast cooling of the adhesive by ventilation.

A preferred embodiment of the process of the invention involves applying a fusion adhesive between the veneer band and carrier body in the amount of 30–70 g/m$^2$ at a temperature of 180°–240° C., the air temperature of the space in which the oscillating pulsator operates being 18°–25° C. and having an air velocity of 5–8 m/sec, the frequency of the pulsator stamp being 10–15/sec, the feed rate of the carrier body being 18–25 m/min, and the thickness of the surface of the carrier body being 0.7–1.5 mm.

A further preferred embodiment includes the application of a synthetic rubber adhesive in an amount of 130–150 g/m$^2$ with a solvent content 60–75% between the veneer band and carrier body, the air in the space in which the oscillating pulsator operates being at a temperature of 25°–50° C., said air having a relative water content of 30–35% and an air velocity of 2–5 m/sec, the temperature of the pulsator stamp being in the range of 50°–100° C. and having a frequency of 10–15/sec. The feed rate of the carrier body is preferably 12–18 m/min and the thickness of the surface of the carrier body being in the range of 0.8–1.5 mm.

By realization of the listed tasks in the processes, the carrier layer thickness of the hollow, thin-walled extruded synthetic products can be reduced preferably by 25–30%.

The necessary conditions are ensured by the process according to the invention in such a way, that in the final phase of the work process such space is formed, in which the parameters necessary for the sticking can be regulated, i.e. temperature of the air space, relative humidity and air velocity, as well as such pulsator provided with heatable stamp formed with negative surface is used, which ensures the necessary pressure and heat pulses, and facilitates the accelerated exit of the vapors, as well as the continuous progress of the material.

The pressure and heat transfer surface of the pulsator stamp performing oscillatory motion perpendicularly to the sticking surface, or at an angle to the direction of progress, exerts pressure and heat pulse to the surface of the veneer in the lower position of its pace, while in its upward pace it brings about a vacuum for seconds between the stamp and veneer surface, in which vacuum the boiling point of the water and adhesive solvent drops. Thereby their evaporation is accelerated, while in the downward pace—pressing pace—the air saturated with vapors under the stamp is forced to fast exit in lateral direction, which during continuous oscillatory motion through the gradual and fast removal of the adhesive solvent continuously increases the cementing power of the adhesive. In a parallel process with the gradual extraction of the water, arrangement and adhesion of the natural veneer to the synthetic surface is ensured, and at the same time the continuous progress is possible. By turning the pulsator axis in the direction of the progress, the horizontal component of the stamp movement is also obtained, which enables the synchronization with the feed rate and at the same time as a result of the horizontal sliding, the quality of the sticking can also be improved.

Within the same machine unit the arrangement and oscillatory actuation of several pulsators along and/or behind each other is possible, first all in cases when in addition to the surface of the extruded synthetic laths, the edges and corners are also veneered.

In case of veneering the surface of flat extruded laths with the use of fusion adhesive, it may be sufficient for the pulsator to exert exclusively pressure pulse onto the surface. The simultaneous air flow in the closed space ensures cooling of the adhesive, and parallel with this the proper adhesion onto the synthetic surface, thus bringing about the jointing of the veneer.

The heat extraction realized with intensive ventilation enables the veneering of thin-walled, material-saving synthetic laths even in case of high sticking temperature and high adhesive-solvent content.

In case of covering extruded laths deviating from the flat surface, having curved, concave or convex shaped, composite, so-called jointed surface, arrangement of the veneer band and its adhesion to the surface of the lath with the application of pressure can be realized by skewing the inlet side of the pulsator stamp at varying angles in such a way, that the angle value of the skewing is the highest in the symmetry axis of the laths, whereby the stamp—regarding the direction of progress—brings about the base point that exerts the first pressure and heat pulse in the symmetry axis by its negative pressure surface. This way the final arrangement and adhesion to the surface will begin in the symmetry axis. As a result of the pulsator's oscillatory motion and applied skewing, the adhesion takes place starting from the symmetry axis towards the edges (the last phase of adhesion takes place at the edges) in such a way that meanwhile the movement of the veneer on the surface is possible until the material passes beyond the skewed section. After this section the negative surface of the stamp is in contact along its full surface with the surface of the veneer-covered lath and this state is maintained until the lath covered with natural veneer leaves the outlet side of the stamp. The skewed negative surface of the stamp enables the covering of curved, hollow, thin-walled extruded laths with continuous process.

An advantage of the process according to the invention is that the pulsator—in contrast with the roller and contact systems exerting continuous pressure—does not exert permanent pressure combined with heat on the surface of the synthetic material. In this way no dimension variations and deformations will occur even in the hollow, thin-walled, extruded lath, first of all because the hollow synthetic body is capable of following the pulse of the oscillatory motion flexibly.

A further advantage of the process according to the invention is that due to the universal character of the pulsator, sticking of the flat and jointed surface can take place with the use of exchangeable stamps on identical and relatively small, quickly convertible—even on existing—machines, against the roller type presses, at which the sticking of the jointed surface require machine construction of multiple length, time-consuming machine conversion and large area.

BRIEF DESCRIPTION OF THE DRAWING

The apparatus for the process suitable for realization of the invention is shown by way of example in the enclosed drawing.

FIG. 2 is a side view showing detail of the apparatus according to FIG. 1.

FIG. 2a is a view-looking in the direction of arrow IIa—IIa on FIG. 2.

FIG. 2b is a section along lines IIb—IIb and IIc—IIc on FIG. 2.

Figure 1:
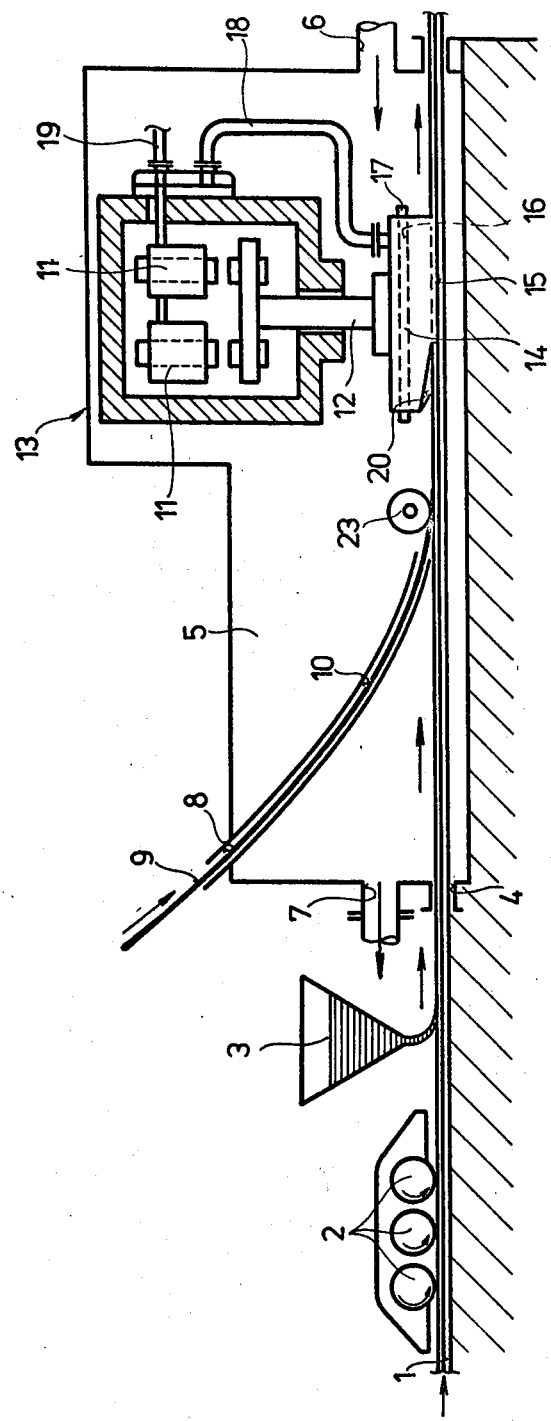
FIG. 1 is a diagram showing operation of the apparatus according to the invention.

Implementation of the process according to the invention and operation of the apparatus take place as follows.

The extruded lath 1 to be covered with natural veneer is placed under feed rollers 2 and during continuous progress guided under sticking roller 3. In this way conventional solvent type or fusion adhesive used suitably for the jointing of wood and synthetic material is applied onto the surface (preferably 55 g/m$^2$). Then during further progress the extruded lath 1 is admitted through inlet opening 4 into space 5, while the solvent and heat present in the adhesive are extracted with scavenging air flown through inflow opening 6 and outlet opening 7. At the same time veneer band 9 is admitted through inlet opening 8, guiding it through duct 10 and roller 23 onto the surface of the extruded lath 1. The two materials guided to each other are forwarded under pulsator 13 provided with electromagnetic oscillator units 11 and push bar 12. Stamp 14 of the pulsator 13 has a negative pressure surface 15 and heating unit formed with electric heating resistors 17 arranged in holes 16. Said heating unit is connected through flexible connecting cable 18 to electric feeder cable 19 of the pulsator. As a result of the pressure and heat pulses of the stamp and the effect of the scavenging air, the extruded lath 1 is jointed with the veneer band 9.

In case of covering extruded laths having surfaces deviating from the flat, the negative pressure surface 15 of the stamp 14 is skewed 20 on the inlet side. The angle of skewing is maximum in the symmetry axis 21, $\alpha_1 =$ preferably 15°–20°, and minimum along the edges 22, $\alpha_2 =$ preferably 7°. The skewing 20 of varying angles facilitates the arrangement of the natural veneer on the surface of the extruded lath to be covered. The feed rate of the extruded lath 1 was 12–25 m/min in the course of our experiments.

The description does not include all the properties and application possibilities realizable with the invention. Thus for instance there is possible use of natural veneer-covered synthetic elements as structural material for furnitures (e.g. kitchen furniture, wardrobe doors, door-case, pillars, frames and inserts).

A favorable property of the surface covering products produced by the process according to the invention is for instance that fire-retardant can be added to the jointing material, or fire retardant capacity of the elements covered with veneer treated with fire retardant agent can be increased, and this way it will surpass the properties existing either in the wood or synthetic material.

What we claim is:

1. A process for the production of a surface wood veneer on furniture and the like comprising the steps of
    (a) extruding a synthetic carrier body in the shape of a thin-walled hollow lath,
    (b) forming a band from wood veneer corresponding to the width of a surface of said carrier body to be covered,
    (c) softening said veneer band,
    (d) applying an adhesive between said veneer band and carrier body,
    (e) guiding the veneer band onto the surface of said carrier body, and
    (f) subjecting said veneer band to the effect of an oscillating pulsator provided with a heat and pressure transmitting stamp in a conditioned space during continuous progress of said veneer band and carrier body and without deformation of said thin-walled, hollow carrier body.

2. A process according to claim 1, wherein said veneer band is softened by wetting.

3. A process according to claim 1, wherein said veneer band is softened by ammonia treatment.

4. A process according to claim 1, wherein a fusion adhesive is applied between said veneer band and carrier body in the amount of 30–70 g/m$^2$ at a temperature of 180°–240° C., the air temperature of the conditioned space is 18°–25° C. and has an air velocity of 5–8 m/sec, the frequency of the pulsator stamp is 10–15/sec, the feed rate of the carrier body is 18–25 m/min, and the thickness of the surface of the carrier body is 0.7–1.5 mm.

5. A process according to claim 1, wherein a synthetic rubber adhesive is applied between said veneer band and carrier body in the amount of 130–150 g/m$^2$ with a solvent content 60–75%, the air temperature of the conditioned space is 25°–50° C. with a relative water content of 30–35% and has an air velocity of 2–5 m/sec, the temperature of the pulsator stamp is 50°–100° C., the frequency of the pulsator is 10–15/sec, the feed rate of the carrier body is 12–18 m/min, and the thickness of the surface of the carrier body is 0.8–1.5 mm.

* * * * *